United States Patent
Wierstra et al.

(10) Patent No.: US 10,432,953 B2
(45) Date of Patent: Oct. 1, 2019

(54) COMPRESSING IMAGES USING NEURAL NETWORKS

(71) Applicant: DeepMind Technologies Limited, London (GB)

(72) Inventors: Daniel Pieter Wierstra, London (GB); Karol Gregor, London (GB); Frederic Olivier Besse, London (GB)

(73) Assignee: DeepMind Technologies Limited, London (GB)

( * ) Notice: Subject to any disclaimer, the term of this patent is extended or adjusted under 35 U.S.C. 154(b) by 129 days.

(21) Appl. No.: 15/396,332

(22) Filed: Dec. 30, 2016

(65) Prior Publication Data

US 2017/0230675 A1   Aug. 10, 2017

Related U.S. Application Data

(60) Provisional application No. 62/292,167, filed on Feb. 5, 2016.

(51) Int. Cl.
*H04N 19/30* (2014.01)
*H04N 19/44* (2014.01)
*G06N 3/04* (2006.01)
*G06N 3/08* (2006.01)
*G06T 9/00* (2006.01)

(52) U.S. Cl.
CPC .......... *H04N 19/30* (2014.11); *G06N 3/0454* (2013.01); *G06N 3/0472* (2013.01); *G06N 3/08* (2013.01); *G06T 9/002* (2013.01); *H04N 19/44* (2014.11)

(58) Field of Classification Search
None
See application file for complete search history.

(56) References Cited

U.S. PATENT DOCUMENTS

| 2004/0151243 A1* | 8/2004 | Bhaskaran | H04N 19/176 375/240.03 |
| 2010/0217145 A1* | 8/2010 | Buscema | G06K 9/6247 600/544 |

OTHER PUBLICATIONS

Venkatesh Lokare et al, Application of Deep Belief Networks for Image Compression, International Journal of Computer Science and Information Technologies, 2015.*
International Preliminary Report on Patentability issued in International Application No. PCT/US2016/069606, dated May 2, 2018, 26 pages.

(Continued)

*Primary Examiner* — Mark Roz
(74) *Attorney, Agent, or Firm* — Fish & Richardson P.C.

(57) ABSTRACT

Methods, systems, and apparatus, including computer programs encoded on computer storage media, for compressing images using neural networks. One of the methods includes receiving an image; processing the image using an encoder neural network, wherein the encoder neural network is configured to receive the image and to process the image to generate an output defining values of a first number of latent variables that each represent a feature of the image; generating a compressed representation of the image using the output defining the values of the first number of latent variables; and providing the compressed representation of the image for use in generating a reconstruction of the image.

18 Claims, 3 Drawing Sheets

(56) References Cited

OTHER PUBLICATIONS

Atreya et al. "Novel Lossy Compression Algorithms with Stacked Autoencoders," anonymous, 2009, XP002768425 [retrieved on Mar. 21, 2017] Retrieved from Internet URL<https://cs229.stanford.edu/proj2009/Atreya0shea.pdf> 5 pages.
Bengio et al. "Modeling high dimensional discrete data with multi-layer neural networks," NIPS, vol. 99, Jun. 11, 1999, 7 pages.
Denton et al. "Deep generative image models using a Laplacian pyramid of adversarial networks," Advances in neural information processing systems, 2015, 9 pages.
Dinh et al. "Nice: Non-linear independent components estimation," arXiv preprint arXiv 1410.8516v6, Apr. 10, 2015, 13 pages.
Goodfellow et al. "Generative adversarial nets," Advances in neural information processing systems, 2014, 9 pages.
Graves et al. "Offline handwriting recognition with multidimensional recurrent neural networks," Advances in neural information processing systems, 2009, 8 pages.
Gregor et al. "Learning representations by maximizing compression," arXiv preprint arXiv1108.1169v1 Aug. 4, 2011, 8 pages.
Gregor et al. "Deep AutoRegressive Networks," arXiv preprint arXiv 1310.8499v2, May 20, 2014, 9 pages.
Hinton et al. "Keeping the neural networks simple by minimizing the description length of the weights," Proceedings of the Sixth Annual conference on Computational Learning Theory, Aug. 1, 1993, 9 pages.
Hinton et al. "Reducing the dimensionality of data with neural networks," Science 313.5786, Jul. 28, 2006, 4 pages.
Hockreiter et al. "Long short-term memory," Neural computation 9(8), Nov. 15, 1996, 46 pages.
International Search Report and Written Opinion in International Application No. PCT/US2016/069606, dated Mar. 31, 2017, 17 pages.
Jiang et al. "Gaussian Processes Autoencoder for Dimensionality Reduction," Advances in Knowledge Discovery and Data Mining. Proceedings of the 18th Pacific-Asia Conference 2014, LNCS 8444 Springer International Publishing Cham, Switzerland, vol. pt. II, 2014, 12 pages.
Kavukcioglu et al. "Learning convolutional feature hierarchies for visual recognition," Advances in neural information processing systems, 2010, 9 pages.
Kingma et al "Adam: A method for Stochastic optimization," arXiv preprint arXiv 1412.6980v1, Dec. 22, 2014, 15 pages.
Kingma et al. "Auto-Encoding Variational Bayes," arXiv preprint arXiv 1312.6114, May 1, 2014, 14 pages.
Lake et al. "Human-level concept learning through probabilistic program induction," Science 350.6266, Dec. 11, 2015, 8 pages.
Larochelle et al. "The neural autoregressive distribution estimator," AISTATS, vol. 1 pt. 2, 2011, 9 pages.
Le. "A Tutorial on Deep Learning Part 2: Autoencoders, Convolutional Neural Networks and Recurrent Neural Networks," Google Brain, Google Inc. Oct. 20, 2015, 20 pages.
Le et al. "Building high-level features using large scale unsupervised learning," IEEE International Conference on Acoustics, Speech and Signal Processing, May 26, 2013, 11 pages.
Lee et al. "Unsupervised learning of hierarchical representations with convolutional deep belief networks," Communications of the ACM, 54(10), Oct. 1, 2011, 9 pages.
Lokare et al. "Application of Deep Belief Networks for Image Compression," Savitribai Phule Pune University, 2015, 5 pages.
Orlowski. "Application of deep belief networks in image semantic analysis and lossy compression for transmission," 2013 Signal Processing Symposium, Jun. 5, 2013, 5 pages.
Radford et al. "Unsupervised representation learning with deep convolutional generative adversarial networks," arXiv preprint arXiv 1511.06434v2, Jan. 7, 2016, 16 pages.
Rezende et al. "Stochastic backpropagation and approximate inference in deep generative models," arXiv preprint arXiv1401.4082v3, May 30, 2014, 14 pages.
Salakhutdinov et al. "Deep boltzmann machines," Artificial Intelligence and Statistics, Apr. 15, 2009, 8 pages.
Simonyan et al. "Very deep convolutional networks for large-scale image recognition," arXiv preprint arXiv 1409.1556v6, Apr. 10, 2015, 14 pages.
Sohl-Dickstein et al. "Deep unsupervised learning using nonequilibrium thermodynamics," arXiv preprint arXiv 1503.03585v8, Nov. 18, 2015, 18 pages.
Van den Oord et al. "Factoring variations in natural images with deep Gaussian mixture models," Advances in Neural information Processing Systems, 2014, 9 pages.
Van den Oord et al. "Pixel recurrent neural networks," arXiv preprint arXiv 1601.06759, Aug. 19, 2016, 11 pages.
Vincent et al. "Stacked denoising autoencoders: Learning useful representations in a deep network with a local denoising criterion," Journal of Machine Learning Research, Dec. 11, 2010, 38 pages.
Witten et al. "Arithmetic coding for data compression," Communications of the ACM, 30.6, Jun. 1, 1987, 21 pages.
Zeiler et al. "Deconvolutional networks," IEEE Conference on Computer Vision and Pattern Recognition, Jun. 2010, 8 pages.
Written Opinion issued in International Application No. PCT/US2016/069606, dated Feb. 12, 2018, 10 pages.

\* cited by examiner

COMPRESSING IMAGES USING NEURAL NETWORKS

CROSS-REFERENCE TO RELATED APPLICATION

This application claims priority to U.S. Provisional Application No. 62/292,167, filed on Feb. 5, 2016. The disclosure of the prior application is considered part of and is incorporated by reference in the disclosure of this application.

BACKGROUND

This specification relates to processing image data through the layers of neural networks to generate outputs.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Variational auto encoders can auto encode input images, i.e., generate output images that are reconstructions of input images provided to the auto encoder. Variational auto encoders typically include an encoder neural network and a generative neural network. Generally, the encoder neural network and the generative neural network in a given variational auto encoder are trained jointly to generate high quality reconstructions of input images.

Once trained, the encoder neural network in the variational auto encoder is configured to receive an input image and to process the input image to generate outputs that define values of latent variables that represent features of the input image. For example, for a given latent variable, a corresponding output of the encoder neural network can parameterize a distribution from which the latent variable is sampled or can be used to generate the parameters of the distribution, e.g., by applying a linear transformation to the output. Some encoder neural networks are recurrent neural networks that generate outputs that define values of latent variables at each of multiple time steps, some are deep neural networks that generate outputs that define values of latent variables at each of multiple layers, and some are deep recurrent neural networks that are both recurrent and deep.

Once trained, the generative neural network is configured to generate a reconstruction of the input image conditioned on the latent variables defined by the outputs of the encoder neural network. That is, the generative neural network receives the values of the latent variables as input and generates a reconstruction of the input image using the received values. As with the encoder neural network, some generative neural networks are recurrent, some generative neural networks are deep, and some generative neural networks are deep recurrent neural networks.

SUMMARY

In general, this specification describes techniques for improved lossy compression of images using variational auto encoder neural networks. In particular, an encoder system processes an image that is to be compressed using an encoder neural network to generate outputs that define values of latent variables that represent different features of the input image. The encoder system then generates a lossy compression of the image based on the outputs.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. By compressing images using latent variables defined by outputs of encoder neural networks, an improved lossy image compression scheme, i.e., a scheme that improves compression quality, can be achieved. That is, compressed representations of images generated as described in this specification can be smaller in size than compressed representations generated by other lossy compression techniques yet can be reconstructed to yield reconstructed images that have a quality that is equal to or better than those generated by the other lossy compression techniques.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
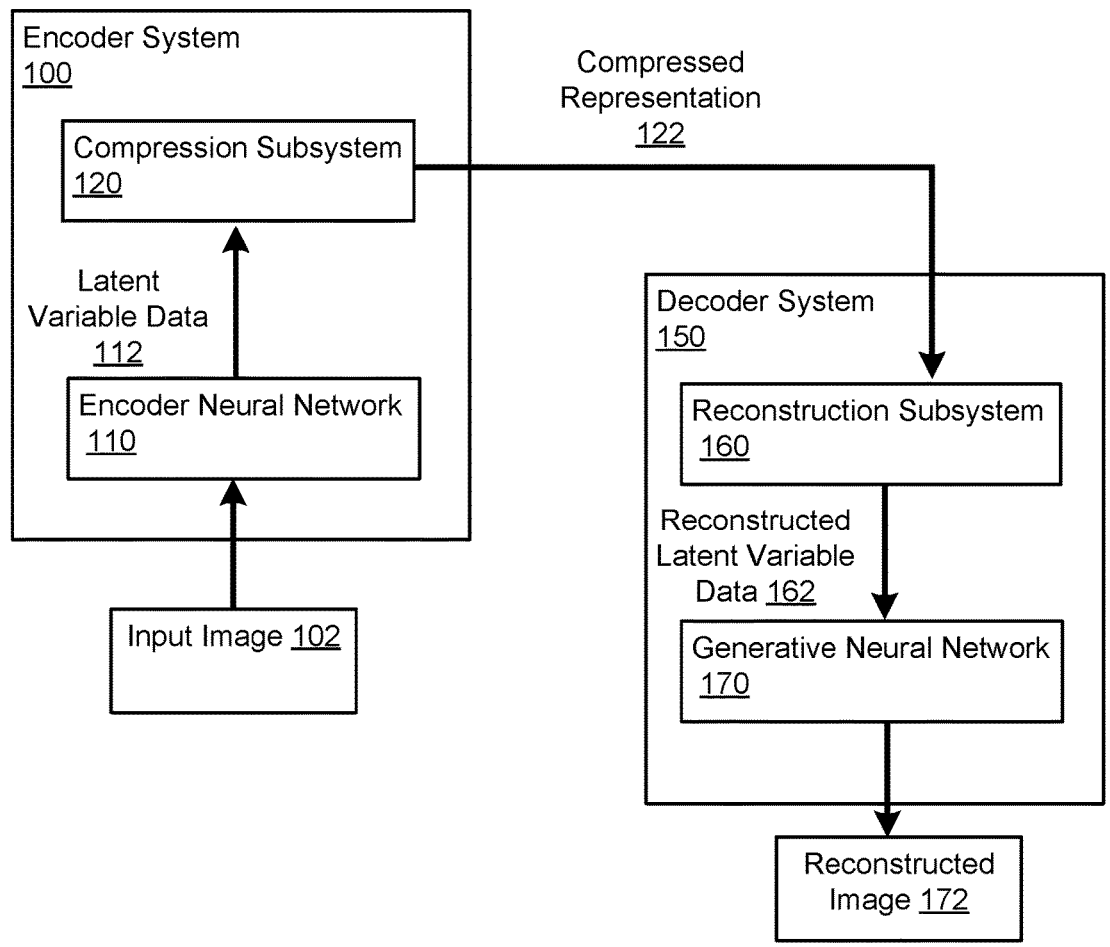
FIG. 1 shows an example encoder system and an example decoder system.

FIG. 1 shows an example encoder system 100 and an example decoder system 150. The encoder system 100 and decoder system 150 are examples of systems implemented as computer programs on one or more computers in one or more locations, in which the systems, components, and techniques described below can be implemented.

The encoder system 100 receives an input image 102 and compresses the input image 102 to generate a compressed representation 122 of the input image 102.

The decoder system 150 receives the compressed representation 122 of the input image 150 and generates a reconstructed image 172 that is a reconstruction of the input image 102. That is, the decoder system 150 generates an estimate of the input image 102 based on the compressed representation 122 of the input image 102.

Generally, the compressed representation 122 is a lossy compression of the image. That is, the compressed representation includes less than all of the data necessary for the decoder system 150 to perfectly reconstruct the image but includes enough data to ensure that the reconstructed image 172 has a desired level of quality relative to the input image 102.

In particular, the encoder system 100 includes an encoder neural network 110 and a compression subsystem 120.

The encoder neural network 110 is a neural network that has been configured through training to process the input image 102 to generate latent variable data 112 for the input image 102.

In particular, the encoder neural network 110 has been trained as the encoder neural network of a variational auto encoder and is therefore configured to receive the image 102 and to process the image 102 to generate outputs defining values of a number of latent variables that each represent a different feature of the image 102. In some implementations, the outputs of the encoder neural network 110 define parameters, e.g., mean or log variance or both, of distributions, e.g., a Gaussian distribution, from which the latent variables are sampled. For example, in some of these implementations, a linear transformation can be applied to the outputs to generate the parameters of the distribution.

In some cases, the encoder neural network 110 is a recurrent neural network that, during processing of the input image 102, generates outputs that define values of latent variables at each of multiple time steps.

In some other cases, the encoder neural network 110 is a deep neural network that generates outputs that define values of latent variables at each of multiple layers. That is, the encoder neural network 110 has a plurality of neural network layers and each of the plurality of neural network layers is configured to generate a respective layer output that defines a value of a respective latent variable that represents a feature of the image.

In yet other cases, the encoder neural network 110 is a recurrent deep neural network that has multiple layers that each generate outputs that define values of latent variables at each of multiple time steps.

The compression subsystem 120 is configured to generate the compressed representation 122 from the latent variable data 112.

To generate a lossy compression, the compression subsystem 120 uses a predetermined proper subset of the latent variables defined by the outputs of the encoder neural network 110 to generate the compressed representation 122, i.e., uses less than all of the latent variables defined by the outputs of the encoder neural network 110 in compressing the input image 102.

That is, the latent variable data 112 defines values of a first number of latent variables that each represent features of the image 102 but the compression subsystem 120 uses less than the first number of the latent variables to compress the image 102. Latent variables that are used in compressing images will be referred to in this specification as compression latent variables, while latent variables that are defined by outputs of the encoder neural network 110 but that are not used in compressing images will be referred to in this specification as remaining latent variables.

As will be evident from the description below, increasing the proportion of the latent variables that are considered compression latent variables increases the quality of the reconstructed image 172 but also increases the size of the compressed representation 122.

In particular, the features of the image are arranged in a hierarchy from least abstract representation of the image to most abstract representation of the image. An example of a feature at a high level, i.e., a highly abstract level, of the hierarchy may be a feature that indicates whether a particular type of object, e.g., a cat, a dog, or a television, is pictured in the image. An example of a feature at a lower level of the hierarchy, i.e., a less abstract feature, may be whether the background of an image contains a particular pattern.

To generate the compressed representation 122, the compression subsystem 120 uses as the compression latent variables the latent variables that correspond to a predetermined number of highest levels of the hierarchy and does not use the remaining latent variables that correspond to features that are lower in the hierarchy.

More particularly, by virtue of being trained as part of the variational auto encoder, during processing of the input image 102 certain outputs of the encoder neural network 110 define values of latent variables that correspond to features in higher levels in the hierarchy than latent variables defined by other outputs of the encoder neural network 110.

In particular, when the encoder neural network 110 is a deep neural network that includes multiple layers arranged in a stack, layers higher in the stack generate outputs that define latent variables that correspond to features in higher levels in the hierarchy while layers lower in the stack generate outputs that define latent variables that correspond to features at levels lower in the hierarchy. Thus, to generate the compressed representation 122, the compression subsystem 120 uses as the compression latent variables the latent variables that correspond to a predetermined number of highest layers in the stack and does not use the remaining latent variables generated by layers lower in the stack.

When the encoder neural network 110 is a recurrent network, outputs generated at earlier time steps define latent variables that correspond to features in higher levels in the hierarchy while outputs generated at later time steps define latent variables that correspond to features lower in the hierarchy. Thus, to generate the compressed representation 122, the compression subsystem 120 uses as the compression latent variables the latent variables that correspond to a predetermined number of earliest time steps and does not use the remaining latent variables generated by later time steps.

When the encoder neural network 110 is a deep recurrent neural network, within a given time step, layers higher in the stack generate outputs that define latent variables that correspond to features in higher levels in the hierarchy while layers lower in the stack generate outputs that define latent variables that correspond to features lower in the hierarchy and, across time steps, outputs generated at earlier time steps define latent variables that correspond to features in higher levels in the hierarchy while outputs generated at later time steps define latent variables that correspond to features lower in the hierarchy.

Thus, to generate the compressed representation 122, the compression subsystem 120 uses as the compression latent variables the latent variables that correspond to outputs generated by some or all of the layers at a predetermined number of earliest time steps and does not use the remaining latent variables generated by later time steps.

Generating a compressed representation from the compression latent variables is described in more detail below with reference to FIG. 2.

In some implementations, the encoder system 100 and the decoder system 150 are implemented on the same set of one or more computers, i.e., when the compression is being used to reduce the storage size of the image when stored locally by the set of one or more computers. In these implementations, the encoder system 120 stores the compressed representation 122 in a local memory accessible by the one or more computers so that the compressed representation can be accessed by the decoder system 150.

In some other implementations, the encoder system 100 and the decoder system 150 are remote from one another, i.e., are implemented on respective computers that are connected through a data communication network, e.g., a local area network, a wide area network, or a combination of networks. In these implementations, the compression is being used to reduce the bandwidth required to transmit the input image 102 over the data communication network. In these implementations, the encoder system 120 provides the compressed representation 122 to the decoder system 150 over the data communication network for use in reconstructing the input image 102.

The decoder system 150 includes a reconstruction subsystem 160 and a generative neural network 170.

The reconstruction subsystem 160 is configured to receive the compressed representation 122 and generate reconstructed latent variable data 162. In particular, the reconstruction subsystem 160 is configured to reconstruct the compression latent variables from the compressed representation and generate new values for the remaining latent variables. Reconstructing compression latent variables and generating new values for the remaining latent variables is described in more detail below with reference to FIG. 3.

The generative neural network 170 is a neural network that has been configured through training to process the reconstructed latent variable data 162 to generate the reconstructed image 172.

In particular, the encoder neural network 110 and the generative neural network 170 have been trained jointly as a variational auto-encoder. Thus, the generative neural network 170 is configured to reconstruct images by processing latent variables defined by outputs of the encoder neural network 110.

Because the compression latent variables are latent variables that correspond to higher level features in the input image 102, the reconstructed image 172 generated by the generative neural network 170 can remain a high quality reconstruction of the input 102 despite not all of the latent variables being provided to the generative neural network 170, i.e., because generating a new value for a lower level feature impacts overall reconstruction quality less than generating a new value for a higher level feature.

Figure 2:
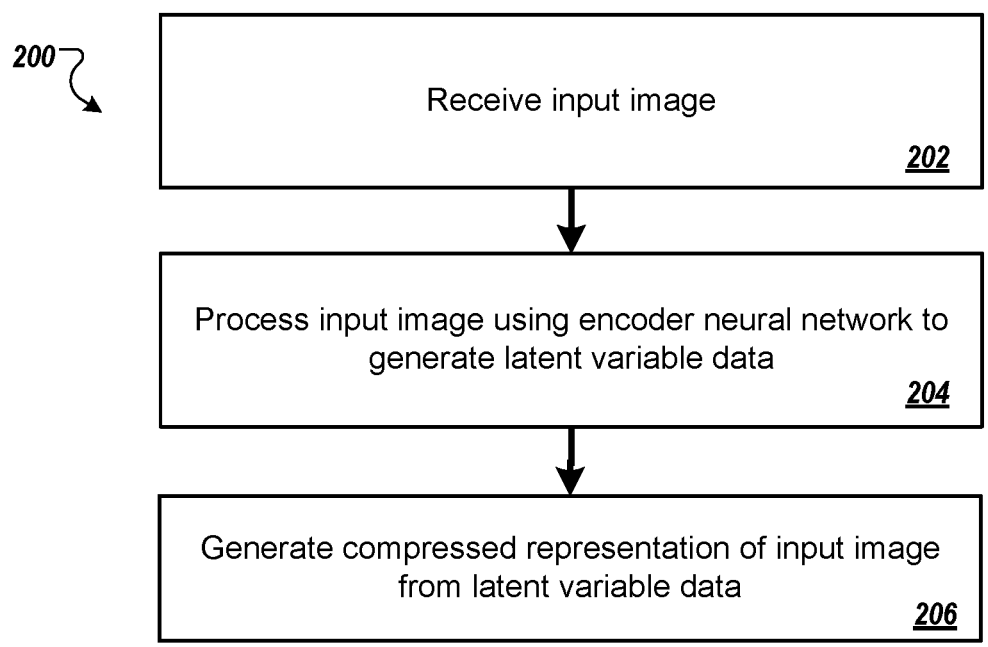
FIG. 2 is a flow diagram of an example process for compressing an image.

FIG. 2 is a flow diagram of an example process 200 for compressing an input image. For convenience, the process 200 will be described as being performed by a system of one or more computers located in one or more locations. For example, an encoder system, e.g., the encoder system 100 of FIG. 1, appropriately programmed, can perform the process 200.

The system receives an input image (step 202).

The system processes the input image using an encoder neural network to generate latent variable data for the input image (step 204). In particular, as described above, the encoder neural network is configured to process the input image to generate outputs that define values of latent variables that each represent a different feature of the input image. For example, for some encoder neural networks, the outputs generated by the encoder neural network define parameters for a distribution, e.g., a Gaussian distribution, from which the latent variables are sampled. For example, the output for a given latent variable can be linearly projected to generate a mean, a log variance, or both of the distribution from which the values of the latent variable are sampled.

The system generates a compressed representation of the input image using the latent variable data (step 206).

Generally, the system generates a lossy compressed representation of the image from the latent variable data using arithmetic encoding.

In an arithmetic encoding technique, the system encodes a sequence of discrete values $x_1, \ldots, x_n$, and a respective probability for each value $p(x_1), \ldots, p(x_n)$ into a compressed representation of $$L = -\sum_{t=1}^{n} \log_2(p(x_t))$$

bits plus a constant of order one. An example arithmetic encoding technique that can be used by the system is described in more detail in Written, Ian H, Neal, Radford M, and Cleary, John G. Arithmetic coding for data compression. Communications of the ACM, 30(6):520-540, 1987.

In some implementations, to generate the values and the corresponding probabilities to be encoded, the system discretizes the compression latent variables and generates a sequence of the discretized compression latent variables as the sequence of discrete values to be compressed. That is, the system uses only the compression latent variables and not the remaining latent variables when compressing the input image.

To discretize a given compression latent variable, the system discretizes the latent variable to approximately the width of the distribution from which the latent variable is sampled, and then assigns the latent variable the discrete value that is closest to the mean of the distribution, i.e., as defined by the corresponding output of the encoder neural network. This is, unlike conventional variational auto encoders, where a value for the latent variable would be sampled from the distribution, a discrete value is assigned to the latent variable based on the mean of the distribution.

The system can then generate a respective probability for each of the compression latent variables by sampling from a generative prior distribution, e.g., a Gaussian distribution, parameterized by a respective intermediate output of the generative neural network during the processing of the corresponding latent variable.

That is, during operation, the generative neural network generates intermediate outputs that can be used to parameterize the generative prior distribution and assign a probability to teach discrete latent variable value. The system maintains an instance of the generative neural network and processes the discrete values of the latent variables using the generative neural network to generate intermediate outputs that parameterize or define parameters of the generative prior distribution. The system then determines, for each compression latent variable, the probability of the latent variable given the generative prior distribution when parameterized using the corresponding intermediate output.

In some other implementations, the system uses a bits-back coding scheme to generate the sequence of discrete values and the corresponding probabilities. In particular, the system discretizes the compression latent variables down to a very high level of precision and uses their corresponding probabilities to transmit the requisite information to the decoding system. Bits-back coding is described in more detail in Hinton, Geoffrey E and Van Camp, Drew. Keeping the neural networks simple by minimizing the description length of the weights. In Proceedings of the sixth annual conference on Computational learning theory, pp. 5-13. ACM, 1993.

Figure 3:
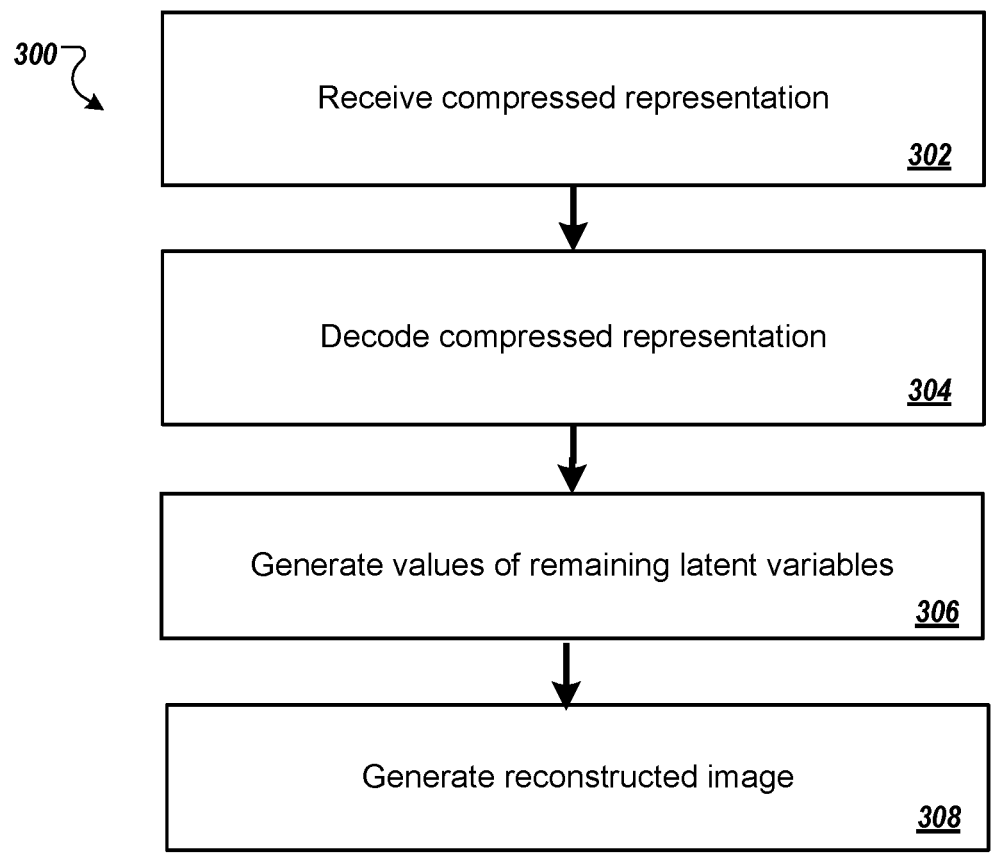
FIG. 3 is a flow diagram of an example process for generating a reconstruction of an image from a compressed representation of the image.

FIG. 3 is a flow diagram of an example process 300 for generating a reconstruction of an image from a compressed representation of the image. For convenience, the process 300 will be described as being performed by a system of one or more computers located in one or more locations. For example, a decoder system, e.g., the decoder system 150 of FIG. 1, appropriately programmed, can perform the process 300.

The system receives the compressed representation of the image (step 302).

The system decodes the compressed representation of the image to reconstruct the compression latent variables for the input image (step 304). That is, the system decodes the compressed representation using the same arithmetic coding technique used to encode the compression latent variables to reconstruct the discrete values of the compression latent variables.

The system generates values for the remaining latent variables (step 306). In particular, the system selects a respective value for each of the remaining latent variables randomly from the prior distribution.

The system generates the reconstruction of the compressed image by conditioning the generative neural network on the reconstructed compression latent variables and the randomly selected remaining latent variables (step 308). That is, as described above, the generative neural network is configured to generate an output image conditioned on a set of latent variables that each correspond to a different image feature. By conditioning the generative neural network on the compression latent variables and the randomly selected remaining latent variables, the system causes the generative neural network to generate a reconstructed image that has features matching those of the input image for the features corresponding to the compression latent variables and has randomly selected values for the features corresponding to the remaining latent variables. Because the compression latent variables are the latent variables that correspond to features from higher levels in the hierarchy, i.e., to features that are most important in defining the appearance of the input image, the generative neural network can still generate a high quality reconstruction even with the values of the remaining latent variables being randomly selected.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving an image;
   processing the image using an encoder neural network, wherein the encoder neural network is configured to receive the image and to process the image to generate an output defining values of latent variables that each represent a feature of the image;
   generating a lossy compressed representation of the image using a first number of the latent variables that is less than all of the latent variables that have values that are defined by the output;
   providing the lossy compressed representation of the image for use in generating a reconstruction of the image; and
   generating the reconstruction of the image from the lossy compressed representation of the image, comprising:
   selecting a value of the latent variables that are not in the first number of latent variables randomly from a prior distribution; and
   generating the reconstruction of the image by conditioning a generative neural network on the values of the first number of latent variables and the randomly selected values of the latent variables that are not in the first number of latent variables.

2. The method of claim 1, wherein generating the lossy compressed representation of the image comprises:
   discretizing the values of the first number of latent variables; and
   compressing a sequence of the discretized values using arithmetic encoding.

3. The method of claim 2, further comprising:
   determining a respective probability for each of the first number of latent variables by sampling from a prior distribution parameterized by a hidden state of a generative neural network, wherein compressing the sequence of the discretized values comprises:
   compressing the sequence of the discretized values and their respective probabilities using arithmetic encoding.

4. The method of claim 1, wherein, for each latent variable, the output parametrizes a distribution from which the value of the latent variable is selected.

5. The method of claim 1, wherein the encoder neural network comprises a plurality of neural network layers, and wherein each of the plurality of neural network layers is configured to generate a respective layer output defining a value of a respective latent variable that represents a feature of the image.

6. The method of claim 5, wherein the latent variables in the first number of latent variables are less than all of the latent variables that have values that are defined by the layer outputs of the plurality of neural network layers.

7. The method of claim 6, wherein the plurality of neural network layers are arranged in a hierarchy, and wherein the first number of latent variables are the latent variables that have values that are defined by the layer outputs of a predetermined number of highest levels in the hierarchy.

8. The method of claim 1, wherein the features that are arranged in a hierarchy from least abstract representation of the image to most abstract representation of the image, and wherein the first number of latent variables are the latent variables that represent features at a predetermined number of highest levels in the hierarchy.

9. The method of claim 1, wherein the generative neural network and the encoder neural network have been jointly trained as a variational auto-encoder.

10. The method of claim 1, wherein the generative neural network and the encoder neural network are recurrent neural networks.

11. The method of claim 1, wherein providing the lossy compressed representation comprises transmitting the lossy compressed representation over a data communication network to a decoder system.

12. The method of claim 1, wherein providing the lossy compressed representation comprises storing the lossy compressed representation in a memory and, in response to a request to retrieve the image from the memory, retrieving the lossy compressed representation from the memory and providing the lossy compressed representation for use in reconstructing the image.

13. A system comprising one or more computers and one or more storage devices storing instructions that when executed by the one or more computers cause the one or more computers to perform operations comprising:
  receiving an image;
  processing the image using an encoder neural network, wherein the encoder neural network is configured to receive the image and to process the image to generate an output defining values of latent variables that each represent a feature of the image;
  generating a lossy compressed representation of the image using a first number of the latent variables that is less than all of the latent variables that have values that are defined by the output;
  providing the lossy compressed representation of the image for use in generating a reconstruction of the image; and
  generating the reconstruction of the image from the lossy compressed representation of the image, comprising:
    selecting a value of the latent variables that are not in the first number of latent variables randomly from a prior distribution; and
    generating the reconstruction of the image by conditioning a generative neural network on the values of the first number of latent variables and the randomly selected values of the latent variables that are not in the first number of latent variables.

14. The system of claim 13, wherein generating the lossy compressed representation of the image comprises:
  discretizing the values of the first number of latent variables; and
  compressing a sequence of the discretized values using arithmetic encoding.

15. The system of claim 14, the operations further comprising:
  determining a respective probability for each of the first number of latent variables by sampling from a prior distribution parameterized by a hidden state of a generative neural network, wherein compressing the sequence of the discretized values comprises:
  compressing the sequence of the discretized values and their respective probabilities using arithmetic encoding.

16. The system of claim 13, wherein the features that are arranged in a hierarchy from least abstract representation of the image to most abstract representation of the image, and wherein the first number of latent variables are the latent variables that represent features at a predetermined number of highest levels in the hierarchy.

17. The system of claim 13, wherein the generative neural network and the encoder neural network have been jointly trained as a variational auto-encoder.

18. One or more non-transitory computer storage media storing instructions that when executed by one or more computers cause the one or more computers to perform operations comprising:
  receiving an image;
  processing the image using an encoder neural network, wherein the encoder neural network is configured to receive the image and to process the image to generate an output defining values of latent variables that each represent a feature of the image;
  generating a lossy compressed representation of the image using a first number of the latent variables that is less than all of the latent variables that have values that are defined by the output;
  providing the lossy compressed representation of the image for use in generating a reconstruction of the image; and
  generating the reconstruction of the image from the lossy compressed representation of the image, comprising:
    selecting a value of the latent variables that are not in the first number of latent variables randomly from a prior distribution; and
    generating the reconstruction of the image by conditioning a generative neural network on the values of the first number of latent variables and the randomly selected values of the latent variables that are not in the first number of latent variables.

* * * * *